(12) United States Patent
Kim et al.

(10) Patent No.: US 8,279,175 B2
(45) Date of Patent: Oct. 2, 2012

(54) SLIM MOUSE FOR MOBILE APPLIANCE AND METHOD FOR MANUFACTURING THE SAME

(75) Inventors: Jong-ho Kim, Daejeon (KR); Hyun-joon Kwon, Seoul (KR); Yon-kyu Park, Daejeon (KR); Min-seok Kim, Daejeon (KR); Dae-im Kang, Daejeon (KR); Jae-hyuk Choi, Daejeon (KR)

(73) Assignee: Korea Research Institute of Standards and Science (KR)

( * ) Notice: Subject to any disclaimer, the term of this patent is extended or adjusted under 35 U.S.C. 154(b) by 115 days.

(21) Appl. No.: 12/677,963

(22) PCT Filed: Oct. 10, 2007

(86) PCT No.: PCT/KR2007/004928
§ 371 (c)(1),
(2), (4) Date: Mar. 12, 2010

(87) PCT Pub. No.: WO2009/035181
PCT Pub. Date: Mar. 19, 2009

(65) Prior Publication Data
US 2010/0253626 A1    Oct. 7, 2010

(30) Foreign Application Priority Data
Sep. 14, 2007  (KR) ........................ 10-2007-0093868

(51) Int. Cl.
*G06F 3/033* (2006.01)
*H01C 17/00* (2006.01)

(52) U.S. Cl. ...................................... 345/163; 345/156
(58) Field of Classification Search ................. 345/163, 345/156
See application file for complete search history.

(56) References Cited

U.S. PATENT DOCUMENTS
5,689,285 A    11/1997    Asher

FOREIGN PATENT DOCUMENTS
| EP | 1380927 | | 1/2004 |
| JP | 07-114438 | | 5/1995 |
| JP | 07114438 | * | 5/1995 |
| JP | 08-272525 | | 10/1996 |
| JP | 08272525 A | * | 10/1996 |

OTHER PUBLICATIONS

International Search Report—PCT/KR2007/004928 dated Jun. 17, 2008.

* cited by examiner

*Primary Examiner* — Amare Mengistu
*Assistant Examiner* — Jennifer Zubajlo
(74) *Attorney, Agent, or Firm* — Cantor Colburn LLP (57) ABSTRACT

A slim mouse for mobile appliances includes a lower polymer film having a metal layer on an upper surface of the lower polymer film, an upper polymer film having a metal layer on a lower surface of the upper polymer film, a donut force sensor array including multiple force sensors, a weight-bumper spacer including a donut sensor portion and a click-detection sensor portion, a pad including a donut sensor portion and a click-detection sensor portion, and a click-detection force sensor.

9 Claims, 11 Drawing Sheets

SLIM MOUSE FOR MOBILE APPLIANCE AND METHOD FOR MANUFACTURING THE SAME

BACKGROUND OF THE INVENTION

1. Field of the Invention

The present invention relates to a slim mouse as an interface for mobile appliances, and more particularly to a slim mouse and a method for manufacturing the same, wherein the mouse can freely perform X, Y, and Z-direction movements, rotation, and clicking of a cursor on a screen using a distribution of force of a tactile sensor for which it is easy to design to be slim.

2. Description of the Related Art

Currently, computer systems employ various types of input units to perform input operations. These operations generally include cursor movement and selection on a display screen and provide functions such as page turning, scrolling, panning, and zooming.

Well-known input units include a button, a switch, a mouse, a trackball, a joystick, etc.

The button and switch are generally mechanical so that they are limited in their control to move the cursor or make selections. For example, the button or switch provides only a function to move the cursor in a specific direction using a key such as an arrow direction key or to make a specific selection using a key such as an enter key, delete key or number key.

When the user moves the mouse along the surface, an input pointer is moved according to the relative movement of the mouse. When the user moves the trackball within the housing, the input pointer is moved according to the relative movement of the trackball. A conventional multifunctional mouse, which provides the input pointer moving function, the selection function and the scroll function based on the position recognition as stated above, requires a relatively wide mouse pad such as a desk or table. As a result, it is difficult to apply the conventional mouse based on the position recognition to mobile devices because the mobile devices are limited in size.

On the other hand, the conventional joystick operates the cursor using force. The conventional joystick is also too thick to be applied to mobile devices which have gradually become slim. The conventional joystick is also limited in its design and development in consideration of a GUI environment.

Figure 17:
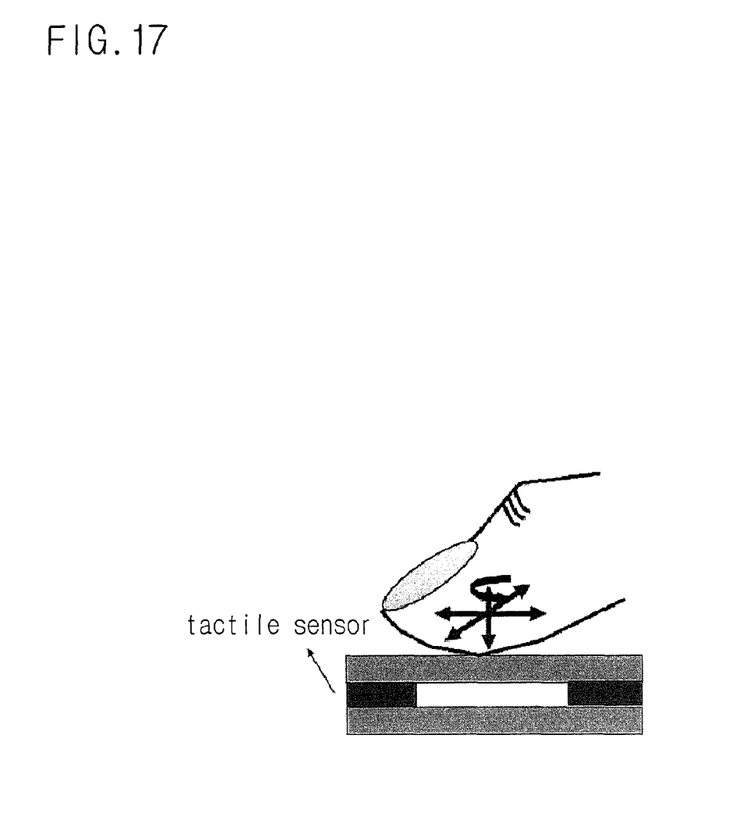
FIG. 17 illustrates a slim mouse which can perform rotations and movements in X, Y, and Z directions using a tactile sensor including multiple force sensors according to the invention.

Therefore, there is a need to develop an input unit, which detects X, Y and Z-direction movements and rotations of the cursor through force-based tactile sensing using a tactile sensor which can be slimmed as shown in FIG. 17, and an algorithm for the detection.

SUMMARY OF THE INVENTION

Therefore, the present invention has been made in view of the above need, and it is an object of the present invention to provide a slim mouse for mobile appliances, which calculates the moving distance and direction of the cursor by detecting contact force using a tactile sensor including multiple force sensors, thereby freely performing X, Y, and Z-direction movements, rotation, and clicking of the cursor, so that it can be used as an interface device for slim devices such as mobile phones, and a method for manufacturing the same.

In accordance with the present invention, the above and other objects can be accomplished by the provision of a slim mouse for mobile appliances using a tactile sensor including multiple force sensors, the slim mouse comprising a lower polymer film having a metal layer on an upper surface of the lower polymer film; an upper polymer film having a metal layer on a lower surface of the upper polymer film; a cursor donut force sensor array including multiple force sensors, each including a pair of resistance patterns, formed above and below the metal layers, the pair of resistance patterns being bonded together such that the resistance patterns oppose each other at a distance with a spacer between the resistance patterns; a weight-bumper spacer formed on the upper polymer film, the weight-bumper spacer including a donut sensor portion and a click-detection sensor portion; a pad formed on the weight-bumper spacer, the pad including a donut sensor portion and a click-detection sensor portion; and a click-detection force sensor including a pair of resistance patterns formed under the click-detection sensor portion. Here, the moving distance and direction of a mouse cursor according to touching by a user are detected using the donut sensor portion and clicking is detected using the click-detection force sensor.

The donut sensor portion and the click-detection sensor portion of each of the weight-bumper spacer and the pad may be formed as a single body or may be formed as separate bodies to prevent errors in acquiring click detection and mouse moving distance detection signals.

The present invention also provides a method for manufacturing a slim mouse for mobile appliances that detects clicking and a moving distance and direction of a mouse cursor by detecting the magnitude and direction of force applied by touching of the mouse using a tactile sensor including multiple force sensors, the method comprising the steps of forming metal layers on an upper polymer film and a lower polymer film, respectively; forming resistance patterns on the metal layers to form a lower pattern and an upper pattern; bonding the resistance patterns of the upper pattern and the lower pattern together such that the resistance patterns oppose each other at a distance with a spacer between the resistance patterns; and forming a pad and a weight-bumper spacer on an upper surface of the upper pattern.

Here, each of the pad and the weight-bumper spacer includes a donut sensor portion and a click-detection sensor portion. The donut sensor portion and the click-detection sensor portion of each of the pad and the weight-bumper spacer may be formed as a single body or as separate bodies. The pad and the weight-bumper spacer may also be integrated to simplify the mouse manufacturing processes.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
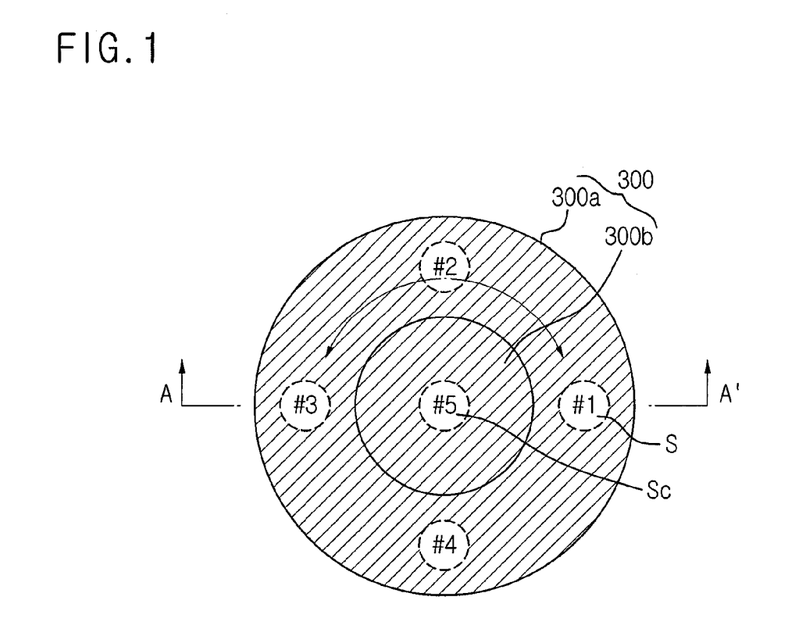
FIG. 1 is a plan view of a slim mouse for mobile appliances according to the present invention.
Figure 2:
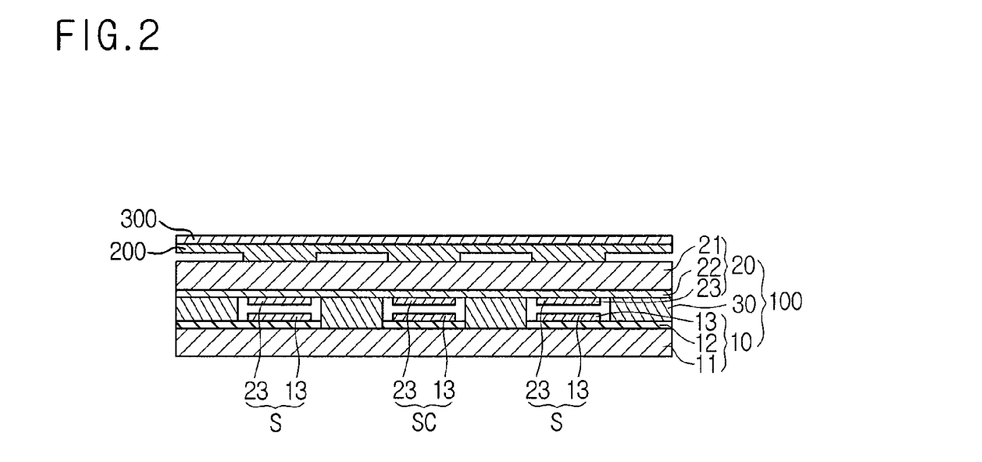
FIG. 2 is a cross-sectional view taken along line A-A' of FIG. 1.

FIG. 1 is a plan view of a slim mouse for mobile appliances according to the present invention and FIG. 2 is a cross-sectional view taken along line A-A' of FIG. 1.

As shown in FIGS. 1 and 2, a mouse using a tactile sensor including multiple force sensors according to the invention is characterized in that it includes upper patterns 20, lower patterns 10, multiple force sensors S, a weight-bumper spacer 200, a pad 300, and a click-detection force sensor Sc and detects clicking and a moving distance and direction of the mouse cursor by detecting the magnitude and direction of force applied by touching of the user.

Here, metal layers 12 and 22 are formed on the upper surface of a lower polymer film 11 and the lower surface of an upper polymer film 21, respectively.

Multiple force sensors S, each including a pair of resistance patterns 13 and 23, are provided above the metal layer 12 and under the metal layer 22. The pair of resistance patterns 13 and 23 faces each other at a distance by means of a spacer 30 between the metal layers 12 and 22.

The weight-bumper spacer 200 includes a donut sensor portion 200a and a click-detection sensor portion 200b on the upper polymer film 21. The pad 300 including a donut sensor portion 300a and a click-detection sensor portion 300b is provided on the weight-bumper spacer 200.

Figure 3:
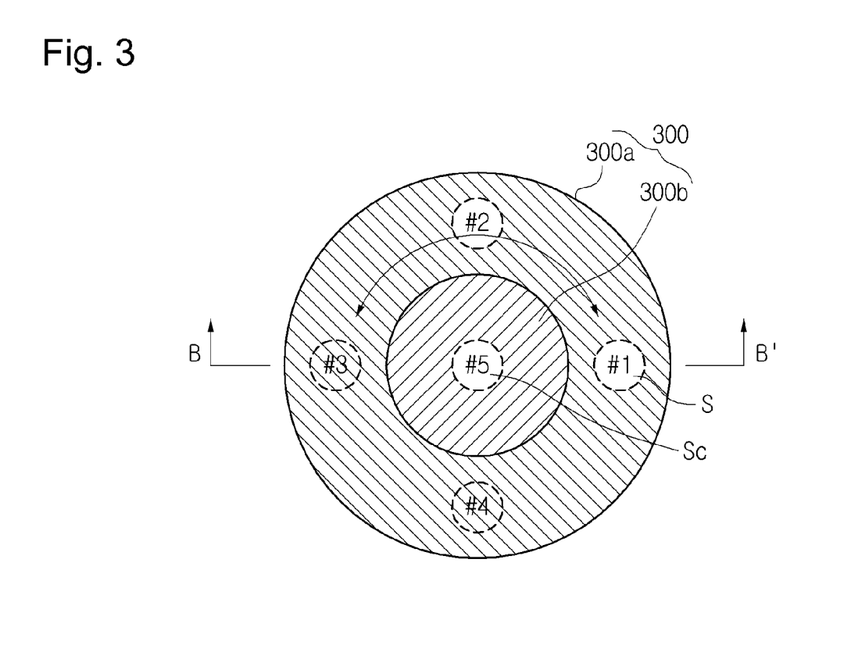
FIG. 3 is a plan view of a modification of the slim mouse for mobile appliances according to the invention.
Figure 4:
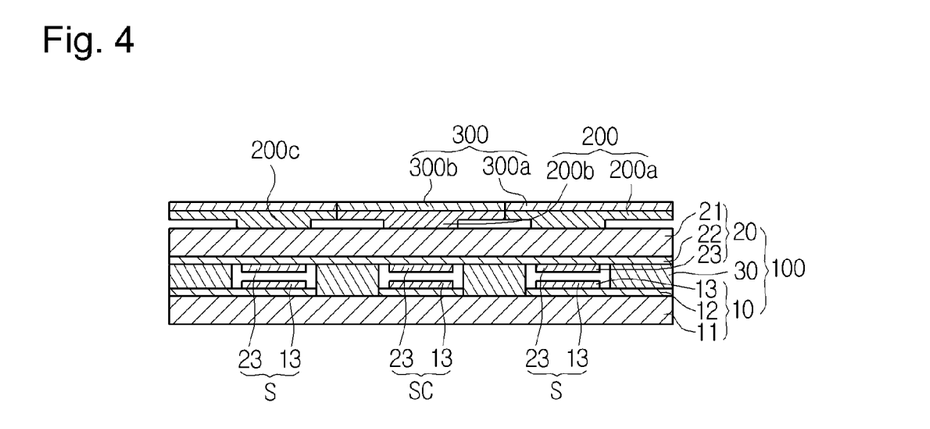
FIG. 4 is a cross-sectional view taken along line B-B' of FIG. 3.

As shown in FIGS. 3 and 4, the donut sensor portions 200a and 300a are formed in a ring shape, and the click-detection sensor portions 200b and 300b are formed in the center of the ring shape of the donut sensor portions 200a and 300a. Further, the force sensors S are circularly disposed along under the ring shape of the donut sensor portion 200a.

The click-detection force sensor Sc includes a pair of resistance patterns 13 and 23 formed under the click-detection sensor portion 200b. The resistance patterns 13 and 23 of the click-detection force sensor Sc face each other at a distance by the spacer 30 between the metal layers 12 and 22.

Referring to FIGS. 2 and 4, the donut sensor portion 200a and the click-detection sensor portion 200b each comprises a protruding bumper 200c, which protrudes toward the force sensor S and the click-detection force sensor Sc. Thus, the pressure exerted on the pad 300 and the weight-bumper spacer 200 can be accurately transferred to the force sensor S and the click-detection force sensor Sc, respectively.

As shown in FIGS. 1 and 2, the donut sensor portion 300a and the click-detection sensor portion 300b in each of the pad 300 and the weight-bumper spacer 200 are formed as a single body. The weight-bumper spacer 200 and the pad 300 can also be formed as a single body.

Alternatively, as shown in FIGS. 3 and 4, the donut sensor portions 200a and 300a and the click-detection sensor portions 200b and 300b of the weight-bumper spacer 200 and the pad 300 may be formed as separate bodies to prevent errors in acquiring click detection and mouse moving distance detection signals. Here, the weight-bumper spacer 200 and the pad 300 can also be formed as separate bodies.

FIGS. 5 to 9 are sectional views illustrating sequential processes of a method for manufacturing a slim mouse for mobile appliances according to the invention. The method according to the present invention is to manufacture a mouse that detects clicking and a moving distance and direction of the mouse cursor by detecting the magnitude and direction of force applied by touching of the mouse using a tactile sensor including multiple force sensors.

Figure 5:
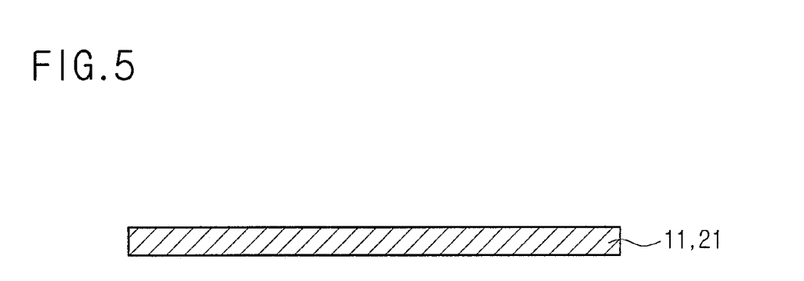
FIGS. 5 to 9 are sectional views illustrating sequential processes of a method for manufacturing a slim mouse for mobile appliances according to the invention.
Figure 6:
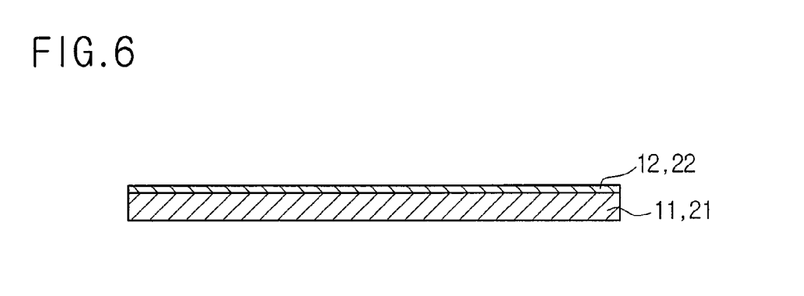

First, as shown in FIG. 6, metal layers 12 and 22 are formed on an upper polymer film 21 and a lower polymer film 11 shown in FIG. 5, respectively.

Figure 7:
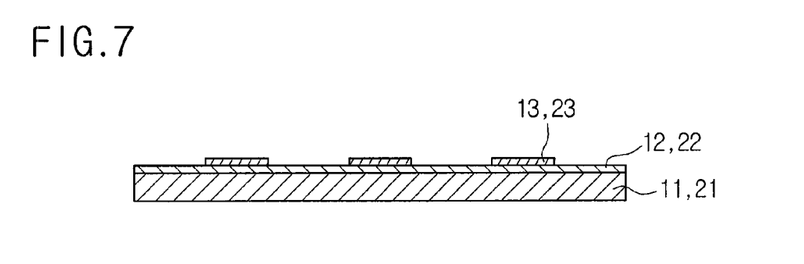

Multiple resistance patterns 13 and 23 are then formed on each of the upper polymer film 21 and the lower polymer film 11 including the metal layers 12 and 22 formed thereon to form lower patterns 10 and upper patterns 20 as shown in FIG. 7.

Here, the resistance patterns 13 and 23 can be formed through desensitizing ink coating or resistance material coating.

Figure 8:
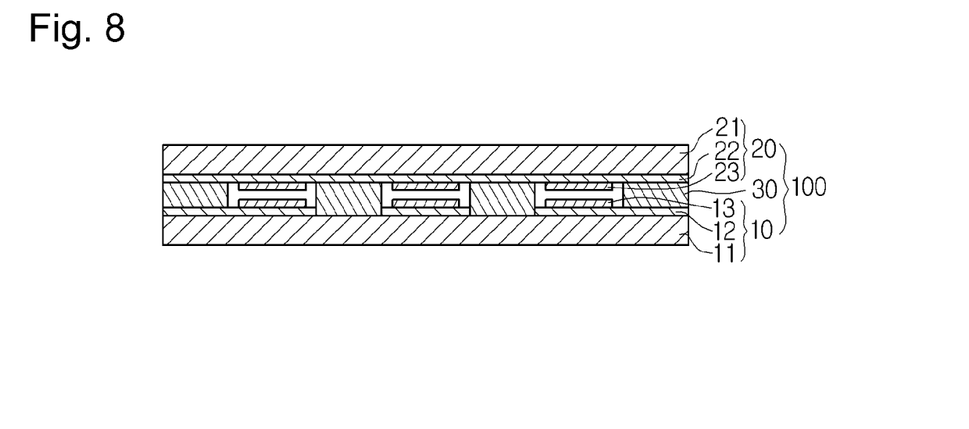

Then, the resistance patterns 13 and 23 of the upper patterns 20 and the lower patterns 10 are bonded together such that the resistance patterns 13 and 23 oppose each other at a distance with a spacer 30 between the resistance patterns 13 and 23, thereby forming a tactile sensor portion. This bonding process can be performed using a double-coated tape or a thermal adhesive tape for film adhesion. The resistance patterns 13 and 23 may also be bonded together in contact with each other without the spacer 30.

Figure 9:
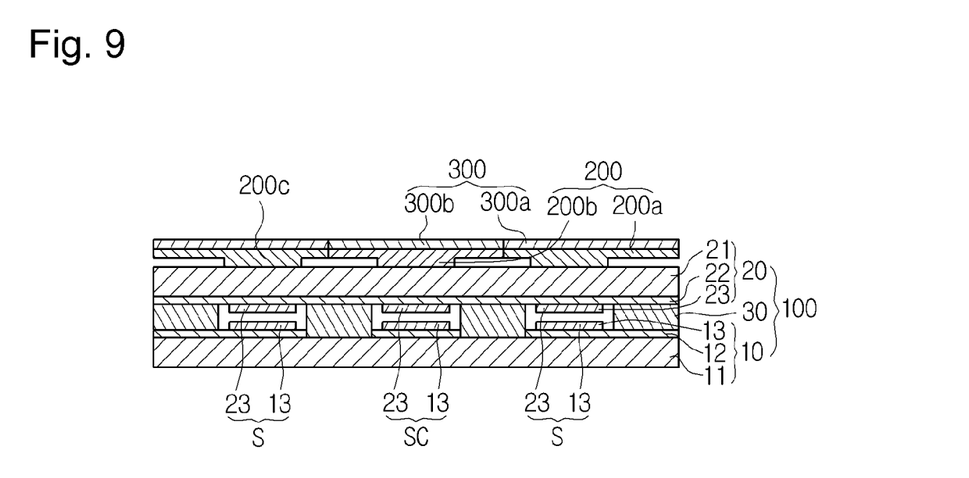

Then, as shown in FIG. 9, a pad 300 and a weight-bumper spacer 200, each including a donut sensor portion 200a and a click-detection sensor portion 200b provided at the center of the donut sensor portion 200a, are formed on the upper surface of the upper patterns 20.

Here, the weight-bumper spacer 200 and the pad 300 may be sequentially bonded on the tactile sensor portion 100. Alternatively, the weight-bumper spacer 200 and the pad 300 may be integrated and then be bonded on the tactile sensor portion 100.

Here, the donut sensor portions and the click-detection sensor portions of the pad and the weight-bumper spacer may be formed as a single body or may be formed as separate bodies to prevent errors in click detection and mouse detection signals.

Figure 10:
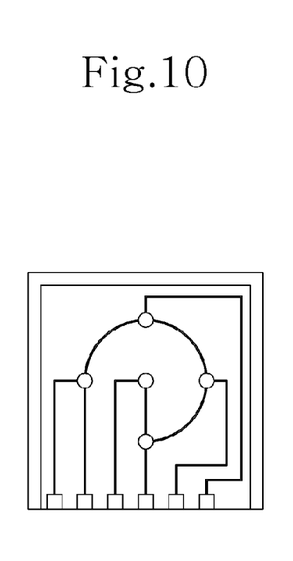
FIG. 10 illustrates a photograph of a slim mouse for mobile appliances manufactured according to the invention.

FIG. 10 illustrates a photograph of the mouse manufactured by the above slim mouse manufacturing method according to the invention. The mouse includes a click detection force sensor formed at the center and multiple force sensors arranged at specific intervals around the click detection force sensor.

A method for acquiring signals using the tactile sensor portion of the slim mouse for mobile appliances of the invention described above will now be described with reference to FIG. 11.

Figure 11:
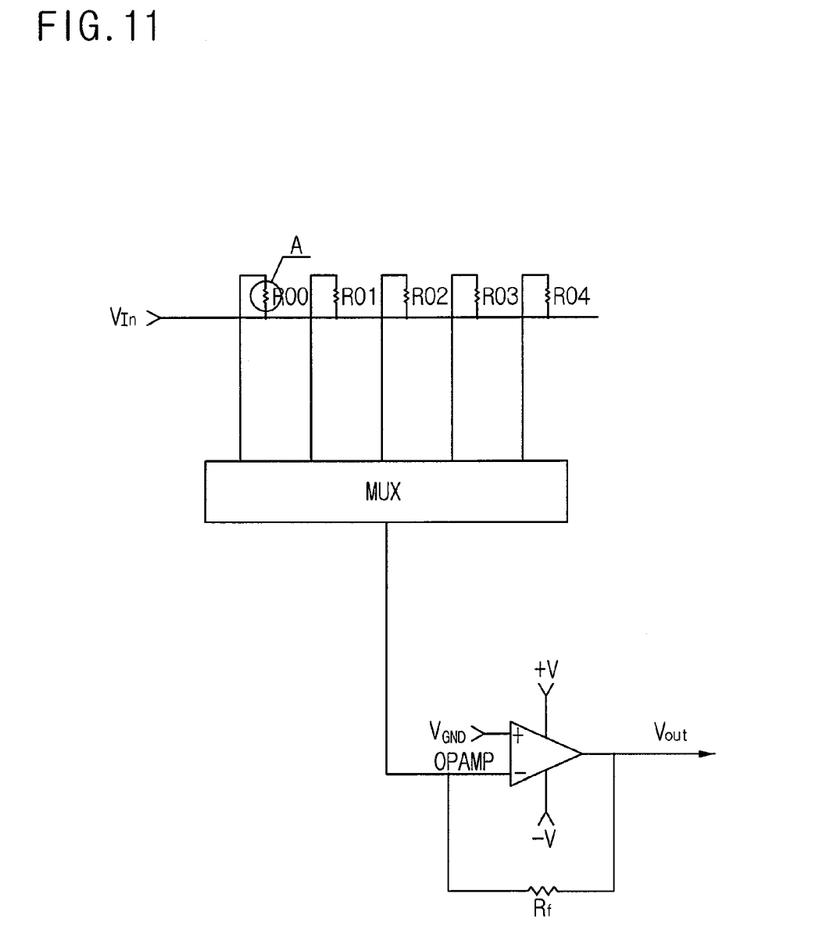
FIG. 11 is a circuit diagram illustrating signal processing of the slim mouse according to the invention.

As shown in FIG. 11, force sensors R00, R01, R02, R03, and R04, each including a pair of resistance patterns, output signals according to their contact resistances due to external force.

First, the outputs of the force sensors R00, R01, R02, R03, and R04 including the resistance patterns are multiplexed through a multiplexer (MUX). The multiplexed signal is applied to a negative (−) input of an analog amplifier (OP AMP) and a ground voltage ($V_{GND}$) is applied to a positive (+) input of the analog amplifier.

An output (Vout) of the analog amplifier for the resistance A (R00) in FIG. 11 is expressed by the following equation.

$$V_{out} = \frac{R_f}{R_{oo}} V_{In} \quad \text{Mathematical Expression 1}$$

When the tactile sensor having the multiple force sensors R00, R01, R02, R03, and R04 is touched, the contact resistances of the force sensors are changed and their output signals according to the contact resistances are amplified through the analog amplifier (OP AMP) after being multiplexed through the multiplexer. Thus, a contact signal can be acquired by detecting the amplified voltage.

A method for detecting the moving distance and direction of the mouse cursor by detecting force through the resistance change measurement described above will now be described with reference to FIGS. 12 to 14.

Figure 12:
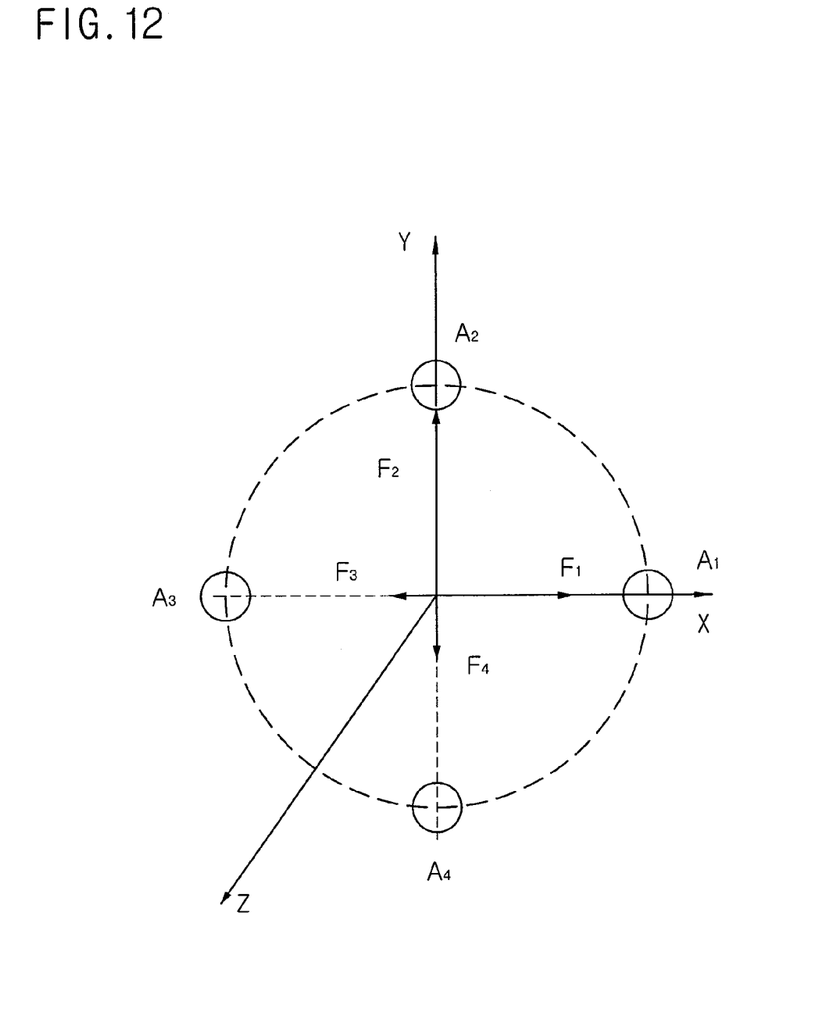
FIGS. 12 and 13 illustrate a method for implementing an algorithm for the slim mouse for mobile appliances according to the invention.

First, as shown in FIG. 12, first, second, third, and fourth sensors $A_1$, $A_2$, $A_3$ and $A_4$ have force vectors $F_1$, $F_2$, $F_3$, and $F_4$, respectively.

Figure 13:
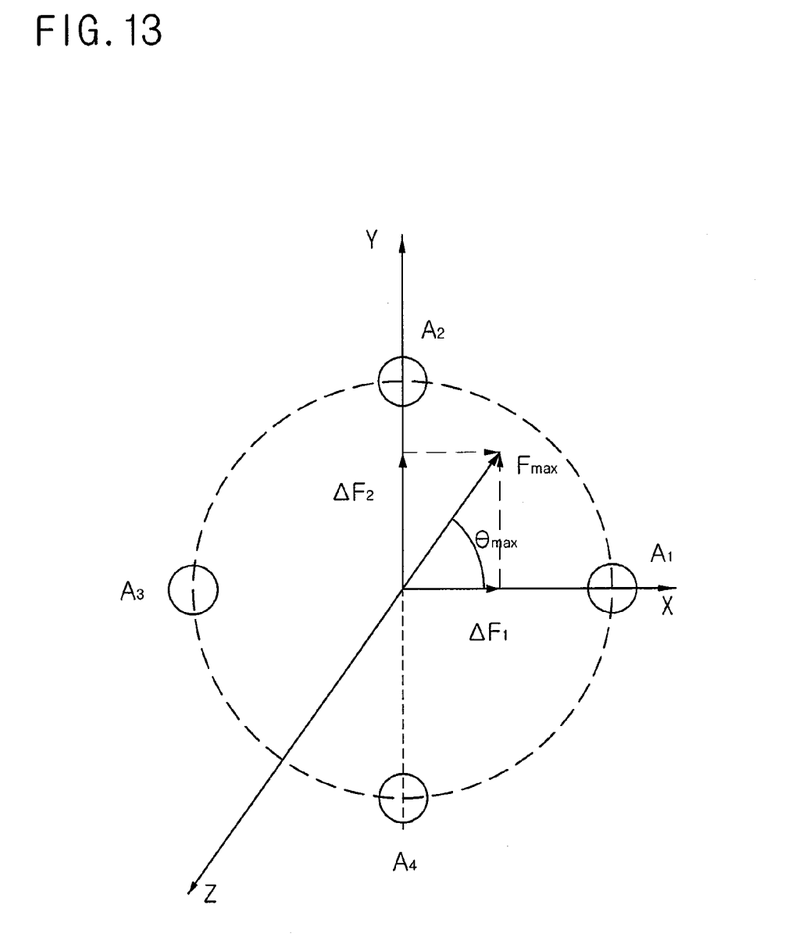

Then, the magnitude $|F_1-F_3|$ of a vector $\Delta F_1$ corresponding to the first sensor and the magnitude $|F_2-F_4|$ of a vector $\Delta F_2$ corresponding to the second sensor are calculated as shown in FIG. 13. Here, the force vector $\Delta F_1$ has an angle of 0° and the force vector $\Delta F_2$ has an angle of 90°.

Then, the X-axis angle $\theta_{max}$ and magnitude $|F_{max}|$ of a vector $F_{max}$ are calculated using the angles 0° and 90° and magnitudes $|F_1-F_3|$ and $|F_2-F_4|$ of the vectors $\Delta F_1$ and $\Delta F_2$.

Here, the magnitude $|F_{max}|$ is defined as $|\Delta F_1|+|\Delta F_2|$ or $\sqrt{|\Delta F_1|^2+|\Delta F_2|^2}$.

And, $$\theta_{max} = \tan^{-1}\left(\frac{|F_2 - F_4|}{|F_1 - F_3|}\right).$$

The X-axis angle $\theta_{max}$ and the magnitude $|F_{max}|$ are used to obtain the direction and magnitude of force of the contact point.

Here, the X direction component of the contact point is $|F_1-F_3|$, which is an X component of the vector $F_{max}$, and the Y direction component of the contact point is $|F_2-F_4|$, which is a Y component of the vector $F_{max}$. As a result, the moving distance of a mouse cursor in the X direction is $|F_1-F_3|$ which is the X component of the vector $F_{max}$, and the moving distance of the mouse cursor in the Y direction is $|F_2-F_4|$ which is the Y component of the vector $F_{max}$.

Figure 14:
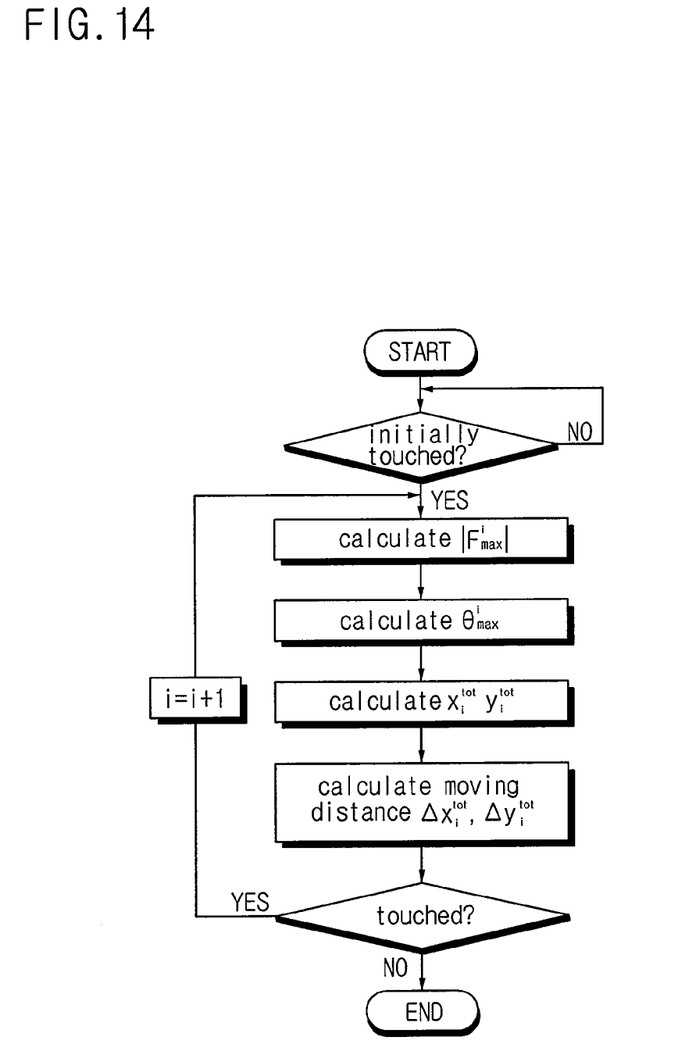
FIG. 14 is a flow chart illustrating sequential processes of the method for implementing the algorithm for the slim mouse for mobile appliances according to the invention.

As shown in the flow chart of FIG. 14, when touching of the tactile sensor is detected after a specific time "i" elapses, $|F^i_{max}|$ and $|\theta^i_{max}|$ are sequentially calculated. Then, a position of the cursor $(x_i^{tot}, y_i^{tot})$ is calculated using the calculated $|F^i_{max}|$ and $|\theta^i_{max}|$. Here, the cursor position is such that $x_i^{tot}=k^i|F^i_{max}|\cos\theta^i_{max}$ and $y_i^{tot}=k^i|F^i_{max}|\sin\theta^i_{max}$. If touching of the tactile sensor is not detected after a specific time "i+1" elapses, the procedure is terminated. If touching of the tactile sensor is detected, $|F^{i+1}_{max}|$ and $|\theta^{i+1}_{max}|$ are sequentially calculated. Then, a position of the cursor $(x_{i+1}^{tot}, y_{i+1}^{tot})$ is calculated using the calculated $\|F^{i+1}_{max}|$ and $|\theta^{i+1}_{max}|$. Here, the cursor position is such that $x_{i+1}^{tot}=k^{i+1}|F^{i+1}_{max}|\cos\theta^{i+1}_{max}$ and $y_{i+1}^{tot}=k^{i+1}|F^{i+1}_{max}|\sin\theta^{i+1}_{max}$.

Moving distances $\Delta x_i^{tot}$ and $\Delta y_i^{tot}$ are calculated using the calculated $x_{i+1}^{tot}$ and $y_{i+1}^{tot}$, where $\Delta x_i^{tot}=x_{i+1}^{tot}-x_i^{tot}$ and $\Delta y_i^{tot}=y_{i+1}^{tot}-y_i^{tot}$ and k is a proportionality constant for each specific time.

Thereafter, it is detected whether or not the tactile sensor has been touched. If touching is detected, the magnitude of the detected force is recalculated. Otherwise, the procedure is terminated.

Figure 15:
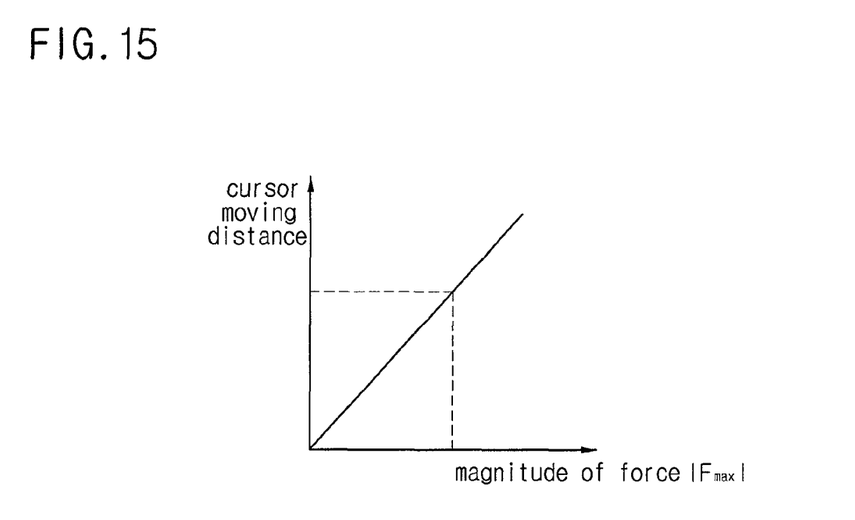
FIGS. 15 and 16 are graphs showing the relation of the moving distance of the cursor to the magnitude of force in the method for implementing the algorithm for the slim mouse for mobile appliances according to the invention.
Figure 16:
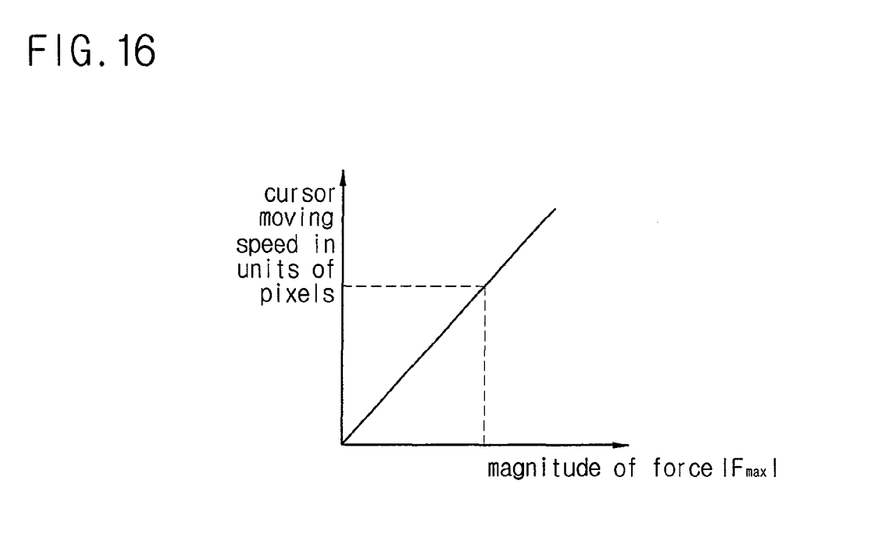

The slim mouse for mobile appliances of the present invention can obtain the moving distance of the mouse cursor on the screen based on the relation of the moving distance of the cursor to the magnitude of the force $|F_{max}|$ as shown in FIG. 15. In addition, using the relation of the moving speed of the cursor in units of pixels to the magnitude of the force as shown in FIG. 16, the slim mouse can not only quickly move the mouse cursor on the screen but also can detect fine movement of the mouse cursor, thereby achieving smooth movement of the mouse cursor.

Clicking of the mouse is detected as the click-detection force sensor provided at the center of the donut sensor portion is pressed.

As described above, the slim mouse for mobile appliances according to the present invention can calculate the moving distance and direction of the cursor by detecting contact force using the tactile sensor including multiple force sensors, so that it can freely perform X, Y, and Z-direction movements, rotation, and clicking of the cursor. Thus, the slim mouse can be used as an interface device for mobile appliances that tend to be slim and spatially restricted. In addition, aesthetic mice with various designs can be easily developed since flexible tactile sensors are used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A slim mouse for mobile appliances using a tactile sensor including multiple force sensors, the slim mouse comprising:
    a lower polymer film having a first metal layer on an upper surface of the lower polymer film;
    an upper polymer film having a second metal layer on a lower surface of the upper polymer film;
    a tactile sensor portion including multiple force sensors, each force sensor including a pair of first resistance patterns formed on the first and second metal layers respectively to face each other at a distance with a spacer disposed between the first and second metal layers;
    a click-detection force sensor including a pair of second resistance patterns formed on the first and second metal layers respectively,
    a weight-bumper spacer formed on the upper polymer film, the weight-bumper spacer including a first donut sensor portion and a first click-detection sensor portion, wherein the first donut sensor portion is formed in a ring shape and the first click-detection sensor portion is formed in a center of the ring shape of the first donut sensor portion, wherein the first donut sensor portion comprises a protruding bumper that protrudes toward the force sensor;
    a pad formed on the weight-bumper spacer, the pad including a second donut sensor portion and a second click-detection sensor portion, which correspond respectively to the first donut sensor portion and the first click-detection sensor portion; and
    wherein the force sensors are circularly arranged along under the first donut sensor portion and the click-detection force sensor is disposed under the first click-detection sensor portion so that a user can perform a touching or rotating action on the second donut sensor portion using a finger to move a mouse cursor.

2. The slim mouse according to claim 1, wherein the first donut sensor portion and the first click-detection sensor portion of the weight-bumper spacer are formed as a single body, or the second donut sensor portion and the second click-detection sensor portion of the pad are formed as a single body.

3. The slim mouse according to claim 1, wherein the first donut sensor portion and the first click-detection sensor portion of the weight-bumper spacer are formed as separate bodies, or the second donut sensor portion and the second click-detection portion of the pad are formed as separate bodies.

4. A method for manufacturing a slim mouse of claim 1, the method comprising the steps of:
    forming metal layers on an upper polymer film and a lower polymer film, respectively;
    forming multiple resistance patterns on the metal layers to form a lower pattern and an upper pattern;
    bonding the upper pattern and the lower pattern together such that the resistance patterns oppose each other at a distance with a spacer disposed between the upper and lower patterns, thereby forming the force sensors and the click-detection force sensor; and
    forming a pad and a weight-bumper spacer on an upper surface of the upper pattern.

5. The method according to claim 4, wherein the pad and the weight-bumper spacer are formed as a single body.

6. The method according to claim 4, wherein each of the pad and the weight-bumper spacer includes a donut sensor portion and a click-detection sensor portion provided at a center portion of the donut sensor portion.

7. The method according to claim 6, wherein the donut sensor portion and the click-detection sensor portion of each of the pad and the weight-bumper spacer are formed as a single body.

8. The method according to claim 6, wherein the donut sensor portion and the click-detection sensor portion of each of the pad and the weight-bumper spacer are formed as separate bodies.

9. The slim mouse according to claim 1, wherein the first click-detection sensor portion comprises a protruding bumper that protrudes toward the click-detection force sensor.

* * * * *